United States Patent [19]

Muguira et al.

[11] Patent Number: 6,088,086
[45] Date of Patent: *Jul. 11, 2000

[54] RANGE DETERMINATION FOR SCANNERLESS IMAGING

[75] Inventors: Maritza Rosa Muguira; John Theodore Sackos; Bart Davis Bradley; Robert Nellums, all of Albuquerque, N.Mex.

[73] Assignee: Sandia Corporation, Albuquerque, N.Mex.

[*] Notice: This patent issued on a continued prosecution application filed under 37 CFR 1.53(d), and is subject to the twenty year patent term provisions of 35 U.S.C. 154(a)(2).

[21] Appl. No.: 08/526,621

[22] Filed: Sep. 11, 1995

[51] Int. Cl.[7] ....................................................... G01C 3/08
[52] U.S. Cl. ............................................. 356/5.15; 356/5.1
[58] Field of Search ........................................ 356/5.1, 5.15

[56] References Cited

U.S. PATENT DOCUMENTS 4,935,616   6/1990   Scott ......................................... 250/213

Primary Examiner—Stephen C. Buczinski

[57] ABSTRACT

A new method of operating a scannerless range imaging system (e.g., a scannerless laser radar) has been developed. This method is designed to compensate for nonlinear effects which appear in many real-world components. The system operates by determining the phase shift of the laser modulation, which is a physical quantity related physically to the path length between the laser source and the detector, for each pixel of an image.

11 Claims, 3 Drawing Sheets

RANGE DETERMINATION FOR SCANNERLESS IMAGING

This invention was made with Government support under Contract DE-AC04-94AL85000 awarded by the U.S. Department of Energy. The Government has certain rights in the invention.

BACKGROUND

This invention addresses the determination of the range parameter in a scannerless range imaging system. In general, such a system functions by sending modulated radiation (preferably optical radiation, but radio or sonics may also be used) toward a target area. An object in that target area will reflect the radiation, resulting in a reflected signal which can be detected at either the source of the original radiation or at a distinct, but known, site. Because the radiation has traveled the distance corresponding to the path connecting the source, object, and detector, the detected radiation will exhibit a phase shift relative to a reference signal derived from the source of the original radiation. Given a knowledge of the geometric, optical, and electronic time delays which characterize the scannerless range imaging system, comparison of the received signal with the original signal allows the phase shift, and hence the distance to the object, to be determined.

Imaging of the range information to obtain three-dimensional information about the distance and shape of an object has traditionally been carried out by scanning the radiation source (e.g., a focused laser beam) in a raster-like manner across the object of interest, and measuring the phase shift for each point on the object. This is a time-consuming process, primarily because of the weight of the scanner optics compatible with a fast, large aperture scanner. The absence of suitable scanners prevents use of laser radars in many potential applications.

The need for a scanner can be eliminated by using a detector array on which the entire scene is imaged simultaneously. Typical of such detector arrays are CCD arrays, which are available with hundreds or even thousands of pixels on a side. They convert incoming photons into electrical charge with reasonably high efficiency (generally more than 20%), which is stored within the detector element until read out. Such detectors are suitable for forming an intensity image. However, as they integrate the incoming light, they are not suitable for direct determination of the phase shift of the modulation of the reflected signal.

Scannerless range imaging systems do exist in the prior art, in particular in U.S. Pat. No. 4,935,616 (Scott), which is included herein in its entirety, and in art referred to therein. The primary focus of the present invention is to improve the invention of Scott.

Scott developed a scannerless range imaging system in which the phase shift information is extracted by beating the reflected signal against a reference signal which is phase-locked to the illuminating laser signal. Briefly, this beating is accomplished by directing the reflected signal into an image intensifier whose gain is periodically varied by an external control voltage. The integral signal output of each CCD pixel then contains information about the path phase shift from the illumination source to the point on the object being imaged on that pixel to the detector pixel.

Scott describes two approaches to deconvoluting the phase information from a series of intensity measurements taken using additional phase shifts between the illumination source and the image intensifier gain. Both approaches depend on modulating the voltage between the photocathode and the thin conductive sheet so that the overall gain function of the image intensifier (the unit comprising Scott's photocathode 34, thin conductive sheet 38, microchannel plate 44, and phosphor plate 46) has the same functional form as does the modulation of the output beam 16. However, if an appropriate sinusoidal voltage is simply applied to a nonlinear image intensifier, Scott's deconvolution procedures do not function satisfactorily, owing to the significantly nonlinear gain vs voltage dependence of commercial image intensifiers. Thus, to implement Scott's invention as disclosed requires that a complex nonsinusoidal control voltage be generated and used to control the gain of the image intensifier.

Scott's claims and specification teach an operable scannerless range imaging system. However, considerable simplification of a practical Scott-type scannerless range imaging system would result if a (for example) simple sinusoidal control voltage can be used to control the image intensifier gain. There is thus a need for a method of operating a scannerless range imaging system comprising nonlinear components which allows the use of sinusoidal (or other simple periodic) control voltages while avoiding the analytical and/or circuit design complications required to use the range determination procedures taught by Scott.

SUMMARY

The present invention is directed to a new approach to the operation of scannerless range imaging systems which satisfies the aforementioned needs.

The inventors have developed a method of operating a Scott-type scannerless range imaging system wherein the nonlinear gain of a realistic image intensifier does not prevent using simple (typically sinusoidal) control voltages or require design of nonlinear compensatory circuits. Using this new method, the range to each point on the object corresponding to a single pixel in the detector array can be determined using simple electrooptical apparatus of the type described by Scott.

The scope of the present invention is not intended to be limited by the above description, but only by the detailed claims set down below. In particular note that a scannerless range imaging system need not function using a coherent light source for illumination (conventional light, or even radio or sound waves may be used), and that nonlinearities in components other than the image intensifier can be dealt with in a manner analogous to that to be described below.

DESCRIPTION

Figure 1:
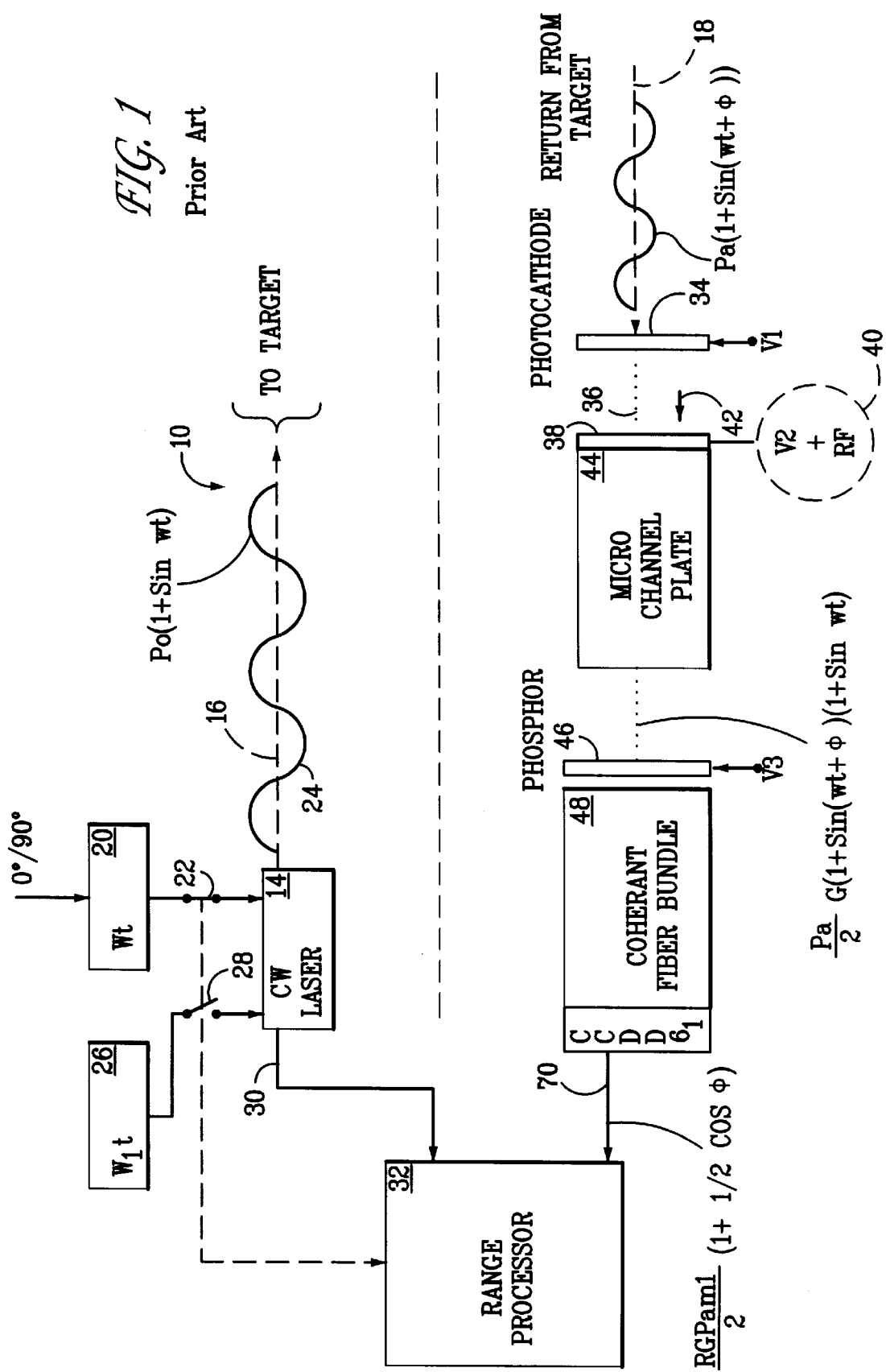
FIG. 1 shows a schematic of the scannerless range imaging system of Scott (U.S. Pat. No. 4,935,616).

The operating principle of Scott's scannerless range imaging system can be understood through a brief discussion of FIG. 1, which is a reproduction of FIG. 1 of Scott. The scannerless range imaging system comprises two portions, a laser transmitter portion 10 and a receiver portion 12. In transmitter 10, a continuous-wave laser source 14 emits an output beam 16 which illuminates a target. The reflections 18 of the output beam from the target are directed back toward receiver 12.

A sinusoidal source 20 is connected through switch 22 to the cw laser 14, thereby modulating the output beam 16 with a sinusoidally varying amplitude modulation 24. A second source of modulating signals 26 may be connected to the cw laser 14 through switch 28. The output line 30 from the cw laser provides a sample of the modulated output beam 16 so that range processor 32 may convert the sample into a phase reference signal.

Reflected signal 18 is a weaker and phase-shifted version of the output beam 16, the amount of phase-shift being equivalent to the round-trip distance between the transmitter and the receiver. In this implementation, the return signal 18 is converted to a modulated electron stream 36 by action of a photocathode 34. The electron stream 36 impinges on a thin conductive sheet 38, accelerated by a periodic voltage from a source 40 which is added to a DC voltage V2. The result is that the amplitude of the electron stream 36 is determined by the amount of light striking the photocathode, whereas the kinetic energy of the electrons making up said electron stream is determined by the sum of V2 and the periodic voltage obtained from source 40. The kinetic energy of the electrons making up the electron stream 36 will determine the gain of the multichannel plate 44, which through secondary emission of electrons amplifies the electron stream 36.

When said amplified electron stream emerges from the multichannel plate, it impinges on a phosphor plate 46 which converts the electron stream back into a photon image. The modulation of this photon image is the result of beating the received light 18 by the voltage-controlled gain of the multichannel plate, and hence contains information concerning the phase-shift of the signal. This photon image is detected by a CCD detector array 50. These detectors integrate the magnitude of the photon image for a given period of time (most simply an integral period of the modulation frequency), and this intensity information is then read out to range processor 32 for range determination.

The problem of obtaining range information from a scannerless system comprising nonlinear components is the focus of the present application. For simplicity, the following discussion considers only the case where both the cw laser source and the nonlinear image intensifier are each driven by sinusoidal control voltages having the same frequency. Classes of implementations which compensate for other nonlinear components (e.g., nonlinear modulation of the cw laser output), or the use of nonsinusoidal control voltages can be handled in a similar manner. The new procedure most similar to that of Scott involves expressing the gain of the image intensifier as $$G(v) = G_0 + G_1 v + G_2 v^2.$$

Examination of FIG. 1 suggests that a quadratic fit to the true nonlinear function is adequate for the present purposes. In this case, the phase shift $\phi$ between the output beam and the reflected signal can be determined as follows:

1. Modulate the output beam so that its power $P(t)=P_o(1+\alpha\sin\omega t)$, so that $\alpha$ is the depth of modulation and $\omega$ is the modulation frequency;
2. Illuminate target;
3. Measure the integrated charge on the CCD detector over a given period of time (typically an integral number of modulation cycles) when $G(v)$ is a constant. This parameter is A;
4. Measure the same parameter when $v(t)=v_o+V\sin\omega t$. This parameter is B;
5. Take the ratio $C=A/B$;
6. $\phi$ is then given by $$\phi = \cos^{-1}[\{\alpha CV(G_1+2G_2v_o)\}^{-1}\{2(1-C)(G_0+G_1v_o+G_2v_o^2)-CG_2V^2\}].$$

The instrument control and data taking required to obtain A and B are controlled by the range processor. The range processor then uses these measurements of electronic charge in the determination of the range to the target, said range R being half the round-trip path length, or $R=c\phi/2\phi$ (c =speed of light).

Unfortunately, the above procedure requires that the nonlinearity of the image intensifier gain be known explicitly. Such knowledge is not required to obtain accurate range information. We have developed a method for operating a Scott-type scannerless range imaging system which comprises comparing the integrated intensities of four images taken with the driving signal to the image intensifier being, respectfully, in phase with the modulation of the illumination source, and $\pi/2$, $\pi$, and $3\pi/2$ out of phase with the illumination source. This replaces Scott's approach of comparing the integrated intensity of an image taken while the illumination source is modulated against a similar image taken with constant illumination.

Figure 2:
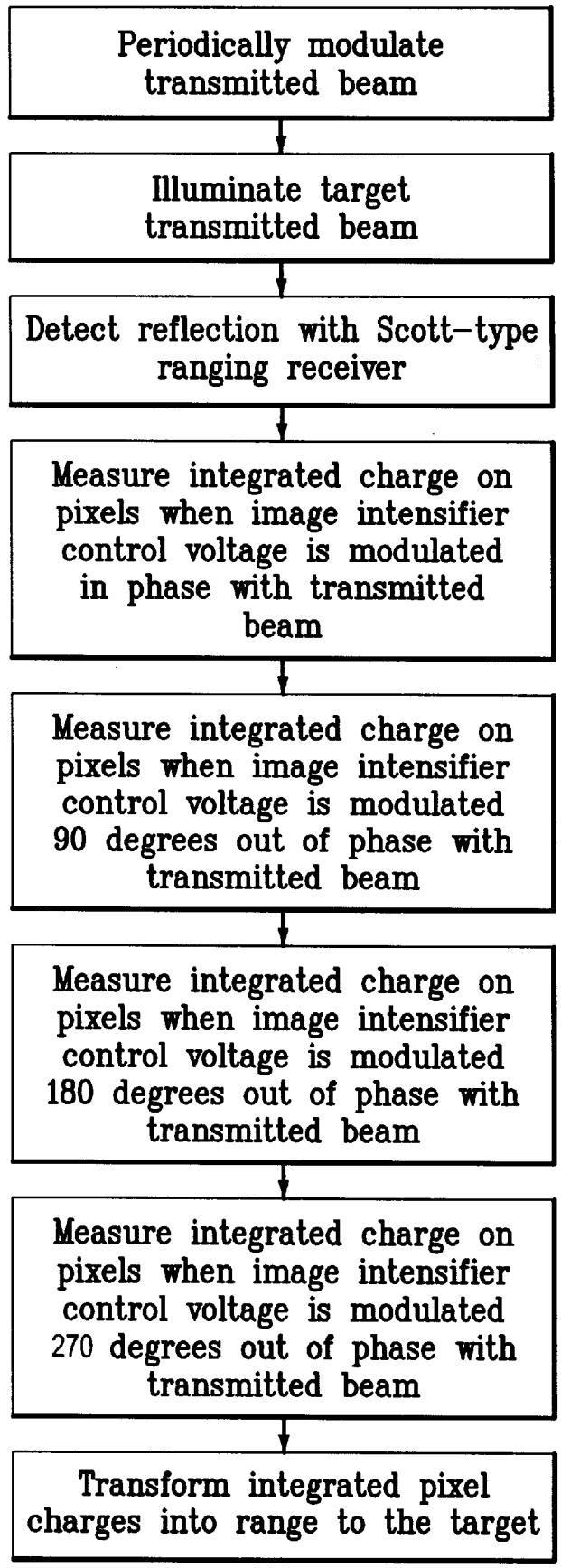
FIG. 2 shows a schematic flow diagram of a method for operating a Scott-type scannerless imaging laser radar based on a sinusoidal modulation scheme.

The new procedure can be outlined as illustrated in FIG. 2:

1. Modulate the output beam 16 so that its power is $P(t)=P_o(1+\alpha\sin\omega t)$, where $\alpha$ is the depth of modulation and $\omega$ is the modulation frequency;
2. Illuminate the target with beam 16 and detect the reflected radiation therefrom with a Scott-type ranging receiver;
3. Measure the charge on the CCD detector integrated over an integral number of modulation cycles for the four cases when the image intensifier gain control signal is $v_n(t)=v_o+V\sin[\omega t+(n-1)\pi/2](n=1,2,3,4)$. These integrated charges are called $I_{ni}$;
4. The phase shift $\phi$ is then given by $$\phi=\tan^{-1}[(I_{2-I4})/(I_{1-I3})].$$

The instrument control and data taking required to obtain the four integrated values of charge are controlled by the range processor 32, which then transforms these measurements into the range to the target.

Figure 3:
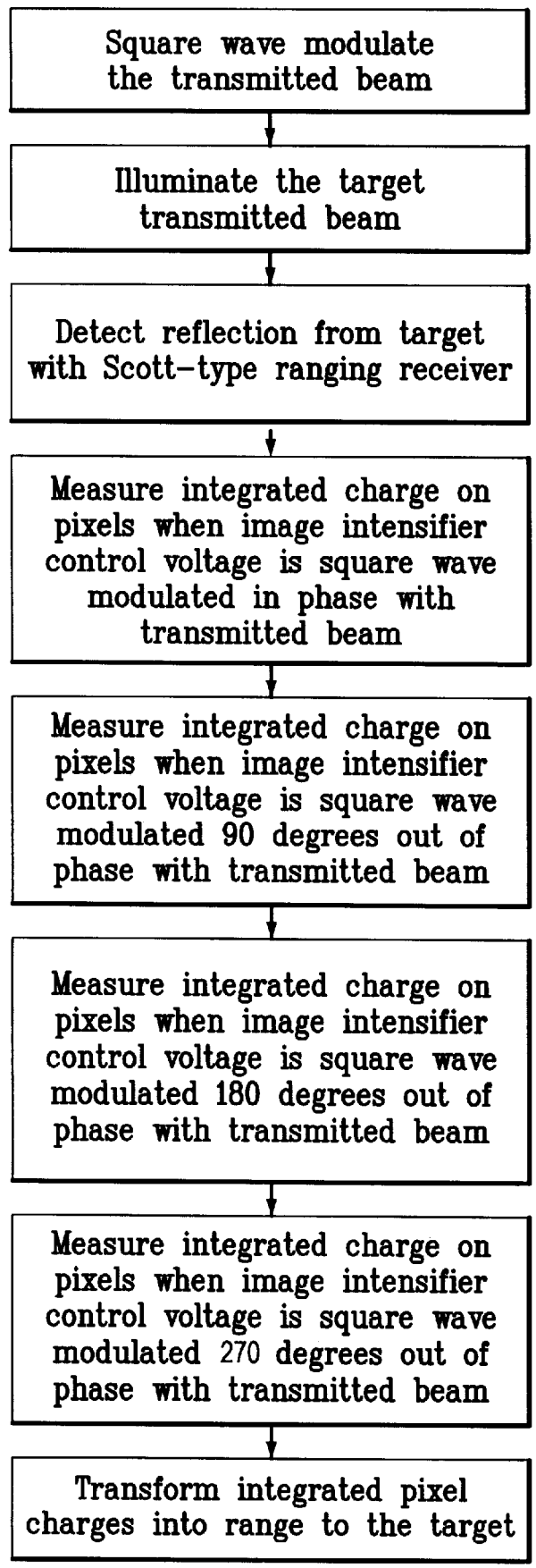
FIG. 3 shows a schematic flow diagram of a method for operating a Scott-type scannerless imaging laser radar based on a square-wave modulation scheme.

Another approach to address the problem of transforming measured integral intensities to range information in a scannerless range imaging system comprising nonlinear components is to choose modulation waveforms which lend themselves to analysis thereof. A particularly simple choice is square wave modulation as illustrated in FIG. 3. The modulation of the output beam is designed to include a square wave component, as is the gain of the image intensifier. For simplicity, the following discussion assumes that the modulation depth of both the output beam and the image intensifier gain is 100%; i.e., both the beam and the intensifier are either on or off.

The image intensifier is driven by a square wave control voltage which varies the gain of the image intensifier discontinuously between 0 and G and which has the same phase as the output beam of the cw laser. Only the part of the received signal returning during the period during which the image intensifier is on will be detected and integrated by the CCD array. The average reflected power is measured by integrating charge A for an integral number of modulation cycles while the control voltage to the image intensifier maintains the gain continuously at G. The phase information is then included by measurement of the integrated charge B over an integral number of modulation cycles while the gain of the image intensifier is square modulated in phase with the output beam. Simply, $A = GPNT/2$, and $B = GPN(T/2 - t)$, where P is the optical power input to the image intensifier, T is the modulation cycle period, N is the number of modulation cycles over which the CCD detectors integrate charge, and t is the round trip time delay. In this simple scheme, $t = 0.5T(1 - B/A)$, where T is the period of the modulation cycle and t is the round trip time delay. The time delay is converted into the round trip distance $2R = ct$.

As the modulation signals are still periodic, however, the range obtained through the above procedure is not unique. For example, a round trip delay time corresponding to 0.25 of a modulation cycle will give the same output as a round trip delay time of 0.75 modulation cycles. The above procedure can only be used to unambiguously measure range, for example, from 0 to $cT/4$.

The unambiguous measurement of range can be extended by combining the information from four images, taken with the image intensifier gain voltage in phase, $\pi/2$, $\pi$, or $3\pi/2$ out of phase with the output beam of the cw laser, said charge accumulations being called A, B, C, and D respectively. Several solutions for the resulting set of time delays $0 < t < T$ are possible, all of which yield unambiguous values for t within this range.

A particularly useful set of solutions, within the range $0 < r < cT$, is:

If $0.5 < \lambda < 2$ and $\eta > 2$, then $0 < t < 0.25T$, and $t = 0.25T(2-\lambda)/(1+\eta)$ If $0.5 < \lambda < 2$ and $0 < \eta < 0.5$, then $0.5T < t < 0.75T$, and $t = 0.25T(4+\rho)/(1+\rho)$ If $0 < \lambda < 0.5$ and $0.5 < \eta < 2$, then $0.25T < t < 0.5T$, and $t = 0.25T(2-3\lambda)/(1-\lambda)$ If $0 < \lambda < 0.5$ and $0 < \eta < 0.5$, then $0.5T < t < 0.75T$, and $t = 0.25T(4+\rho)/(1+\rho)$ If $0.5 < \rho < 2$ and $\eta > 2$, then $0 < t < 0.25T$, and $t = 0.25T(2-\lambda)/(1+\lambda)$ If $0.5 < \rho < 2$ and $0 < \eta < 0.5$, then $0.5T < t < 0.75T$, and $t = 0.25T(4+\rho)/(1+\rho)$ If $0 < \rho < 0.5$ and $0.5 < \lambda < 2$, then $0 < t < 0.25T$, and $t = 0.25T(2-\lambda)/(1+\lambda)$ If $0 < \rho < 0.5$ and $\lambda > 2$, then $0.75T < t < T$, and $t = 0.25T(4-5\rho)/(1-\rho)$ This is not a unique set of solutions, but serves to illustrate how the intensity ratios between images taken under different modulation conditions can be utilized to remove ambiguities in the conversion between intensities and time delay.

The above implementations of a scannerless range imaging system comprising nonlinear components have been described in detail solely to illustrate the application of the relevant design principles. Only those restrictions appearing in the claims are intended to limit the scope of this invention.

We claim:

1. A method for operating a Scott-type scannerless imaging laser radar, said laser radar comprising a transmitted beam, a target, and a ranging receiver comprising a detector means having n pixels, modulation means comprising an image intensifier whose gain is controlled by an image intensifier control voltage, and a range processor, the method comprising:

i) modulating the transmitted beam power periodically;

ii) illuminating the target with the transmitted beam;

iii) detecting a reflection of the transmitted beam from the target using the ranging receiver;

iv) measuring a charge $A_n$ at each of the n pixels of the detector means of the ranging receiver integrated over an integral number of modulation cycles while the image intensifier control voltage is periodically modulated in phase with the transmitted beam;

v) measuring a charge $B_n$ at each of the n pixels of the detector means of the ranging receiver integrated over an integral number of modulation cycles while the image intensifier control voltage is periodically modulated 90 degrees out of phase with the transmitted beam;

vi) measuring a charge $C_n$ at each of the n pixels of the detector means of the ranging receiver integrated over an integral number of modulation cycles while the image intensifier control voltage is periodically modulated 180 degrees out of phase with the transmitted beam;

vii) measuring a charge $D_n$ at each of the n pixels of the detector means of the ranging receiver integrated over an integral number of modulation cycles while the image intensifier control voltage is periodically modulated 270 degrees out of phase with the transmitted beam, and;

viii) determining range to the target by extracting from the integrated charges $A_n$, $B_n$, $C_n$, and $D_n$ a round trip phase shift $\phi_n$ for each of the n pixels of the detector means of the ranging receiver.

2. The method of claim 1, wherein the periodic modulation of the transmitted beam and the periodic modulation of the image intensifier control voltage have substantially the same functional form.

3. The method of claim 2, wherein the periodic modulation of the transmitted beam is sinusoidal.

4. A method for operating a Scott-type scannerless imaging laser radar, said laser radar comprising a transmitted beam, a target, and a ranging receiver comprising a detector means having n pixels, modulation means comprising an image intensifier whose gain is controlled by an image intensifier control voltage, and a range processor, the method comprising:

i) modulating the transmitted beam power periodically;

ii) illuminating the target with the transmitted beam;

iii) detecting a reflection of the transmitted beam from the target using the ranging receiver;

iv) measuring a charge $A_n$ at each of the n pixels of the detector means of the ranging receiver integrated over an integral number of modulation cycles while the image intensifier control voltage is held at a fixed level providing a non-zero image intensifier gain $G_0$;

v) measuring a charge $B_n$ at each of the n pixels of the detector means of the ranging receiver integrated over an integral number of modulation cycles while the image intensifier control voltage is periodically modulated in phase with the transmitted beam, and;

vi) determining range to the target by extracting from the integrated charges $A_n$ and $B_n$ a round trip phase shift $\phi_n$ for each of the n pixels of the detector means of the ranging receiver.

5. The method of claim 4, wherein the periodic modulation of both the transmitted beam and the image intensifier control voltage is sinusoidal.

6. The method of claim 4, wherein the periodic modulation of both the transmitted beam and the image intensifier control voltage is square wave modulated, yielding an image intensifier gain which varies essentially discontinuously between $G_0$ and a second gain value.

7. The method of claim 6, wherein the modulation depth of the square wave modulation of the transmitted beam is 100%.

8. The method of claim 6, wherein the second gain value of the image intensifier gain is zero gain.

9. A method for operating a Scott-type scannerless imaging laser radar, said laser radar comprising a transmitted beam, a target, and a ranging receiver comprising a detector means having n pixels, modulation means comprising an image intensifier whose gain is controlled by an image intensifier control voltage to be either high or low, and a range processor, the method comprising:

i) modulating the transmitted beam power with a square wave component;

ii) illuminating the target with the transmitted beam;

iii) detecting a reflection of the transmitted beam from the target using the ranging receiver;

iv) measuring a charge $A_n$ at each of the n pixels of the detector means of the ranging receiver integrated over an integral number of modulation cycles while the image intensifier control voltage is square wave modulated between high and low values in phase with the transmitted beam;

v) measuring a charge $B_n$ at each of the n pixels of the detector means of the ranging receiver integrated over an integral number of modulation cycles while the image intensifier control voltage is square wave modulated between high and low values 90 degrees out of phase with the transmitted beam;

vi) measuring a charge $C_n$ at each of the n pixels of the detector means of the ranging receiver integrated over an integral number of modulation cycles while the image intensifier control voltage is square wave modulated between high and low values 180 degrees out of phase with the transmitted beam;

vii) measuring a charge $D_n$ at each of the n pixels of the detector means of the ranging receiver integrated over an integral number of modulation cycles while the image intensifier control voltage is square wave modulated between high and low values 270 degrees out of phase with the transmitted beam;

viii) determining range to the target by extracting from the integrated charges $A_n$, $B_n$, $C_n$, and $D_n$ a round trip phase shift $\phi_n$ for each of the n pixels of the detector means of the ranging receiver.

10. The method of claim 9, wherein the modulation depth of the square wave modulation of the transmitted beam is 100%.

11. The method of claim 9, wherein the low gain level of the image intensifier is zero gain.

\* \* \* \* \*